(12) United States Patent
Horn et al.

(10) Patent No.: US 11,025,383 B1
(45) Date of Patent: Jun. 1, 2021

(54) TONE RESERVATION BASED AT LEAST IN PART ON A SIGNAL DISTORTION

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,711

(22) Filed: Nov. 11, 2020

(51) Int. Cl.
*H04L 5/00* (2006.01)
*H04L 5/02* (2006.01)
*H04L 25/02* (2006.01)

(52) U.S. Cl.
CPC .......... *H04L 5/0046* (2013.01); *H04L 5/0007* (2013.01); *H04L 5/023* (2013.01); *H04L 25/0224* (2013.01)

(58) Field of Classification Search
CPC ..... H04L 5/0046; H04L 5/0007; H04L 5/023; H04L 25/0224
See application file for complete search history.

(56) References Cited

U.S. PATENT DOCUMENTS

2009/0196361 A1* 8/2009 Chan ..................... H04L 1/0643
375/260

* cited by examiner

*Primary Examiner* — Curtis B Odom
(74) *Attorney, Agent, or Firm* — Qualcomm Incorporated

(57) ABSTRACT

Various aspects of the present disclosure generally relate to wireless communication. In some aspects, a base station may determine a signal distortion based at least in part on a number of analog-to-digital conversion (ADC) bits used for signal quantization at a user equipment (UE). The base station may remap a tone reservation and data based at least in part on the signal distortion. The base station may transmit, to the UE, a remapped tone reservation and remapped data. Numerous other aspects are provided.

30 Claims, 9 Drawing Sheets

TONE RESERVATION BASED AT LEAST IN PART ON A SIGNAL DISTORTION

FIELD OF THE DISCLOSURE

Aspects of the present disclosure generally relate to wireless communication and to techniques and apparatuses for tone reservation based at least in part on a signal distortion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes determining a signal distortion based at least in part on a number of analog-to-digital conversion (ADC) bits used for signal quantization at a user equipment (UE); remapping a tone reservation and data based at least in part on the signal distortion; and transmitting, to the UE, a remapped tone reservation and remapped data.

In some aspects, a method of wireless communication performed by a UE includes receiving, from a base station, an indication of a tone reservation location, wherein the tone reservation location corresponds to a remapped tone reservation that is based at least in part on a signal distortion associated with a number of ADC bits used for signal quantization at the UE; receiving, from the base station, the remapped tone reservation and remapped data; and discarding the remapped tone reservation from the remapped data based at least in part on the indication of the tone reservation locations.

In some aspects, a base station for wireless communication includes a memory and one or more processors operatively coupled to the memory, the memory and the one or more processors configured to: determine a signal distortion based at least in part on a number of ADC bits used for signal quantization at a UE; remap a tone reservation and data based at least in part on the signal distortion; and transmit, to the UE, a remapped tone reservation and remapped data.

In some aspects, a UE for wireless communication includes a memory and one or more processors operatively coupled to the memory, the memory and the one or more processors configured to: receive, from a base station, an indication of a tone reservation location, wherein the tone reservation location corresponds to a remapped tone reservation that is based at least in part on a signal distortion associated with a number of ADC bits used for signal quantization at the UE; receive, from the base station, the remapped tone reservation and remapped data; and discard the remapped tone reservation from the remapped data based at least in part on the indication of the tone reservation locations.

In some aspects, a non-transitory computer-readable medium storing a set of instructions for wireless communication includes one or more instructions that, when executed by one or more processors of a base station, cause the base station to: determine a signal distortion based at least in part on a number of ADC bits used for signal quantization at a UE; remap a tone reservation and data based at least in part on the signal distortion; and transmit, to the UE, a remapped tone reservation and remapped data.

In some aspects, a non-transitory computer-readable medium storing a set of instructions for wireless communication includes one or more instructions that, when executed by one or more processors of a UE, cause the UE to: receive, from a base station, an indication of a tone reservation location, wherein the tone reservation location corresponds to a remapped tone reservation that is based at least in part on a signal distortion associated with a number of ADC bits used for signal quantization at the UE; receive, from the base station, the remapped tone reservation and remapped data; and discard the remapped tone reservation from the remapped data based at least in part on the indication of the tone reservation locations.

In some aspects, an apparatus for wireless communication includes means for determining a signal distortion based at least in part on a number of ADC bits used for signal quantization at a UE; means for remapping a tone reservation and data based at least in part on the signal distortion; and means for transmitting, to the UE, a remapped tone reservation and remapped data.

In some aspects, an apparatus for wireless communication includes means for receiving, from a base station, an indication of a tone reservation location, wherein the tone reservation location corresponds to a remapped tone reservation that is based at least in part on a signal distortion associated with a number of ADC bits used for signal quantization at the apparatus; means for receiving, from the base station, the remapped tone reservation and remapped data; and means for discarding the remapped tone reservation from the remapped data based at least in part on the indication of the tone reservation locations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
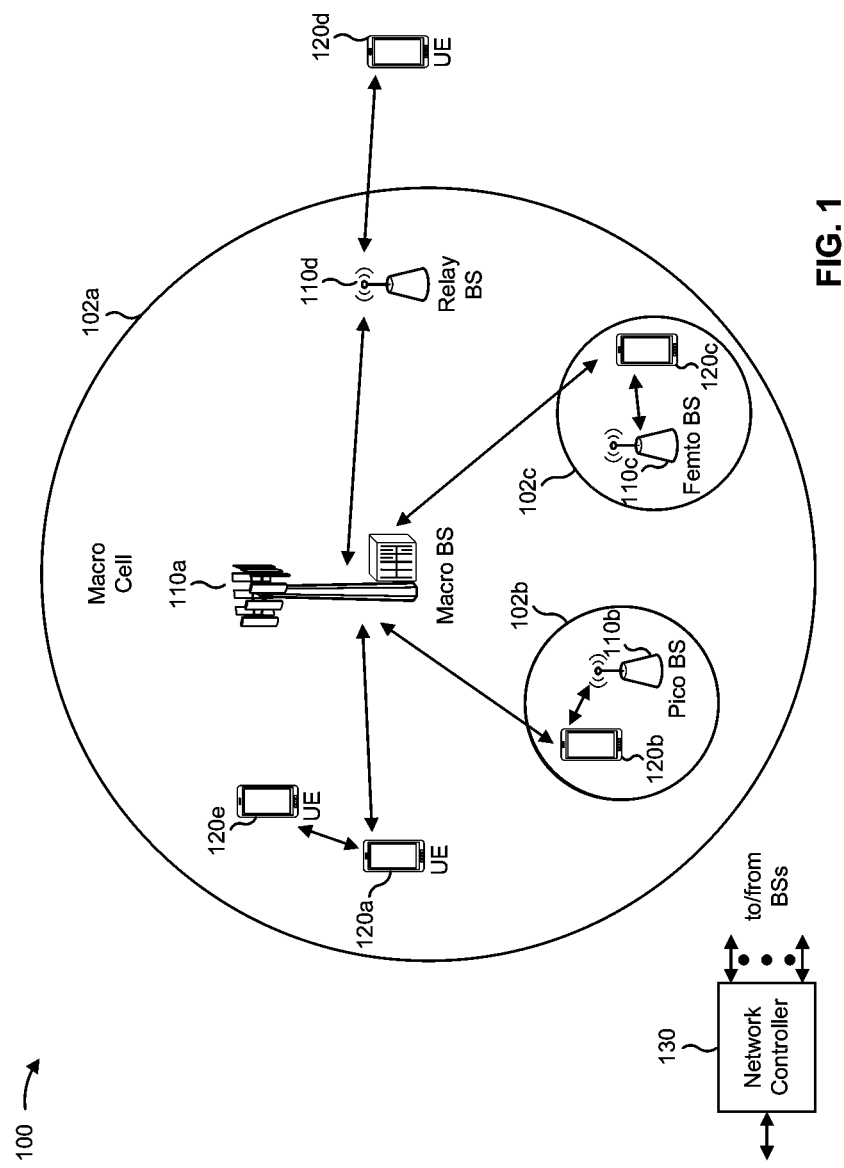
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
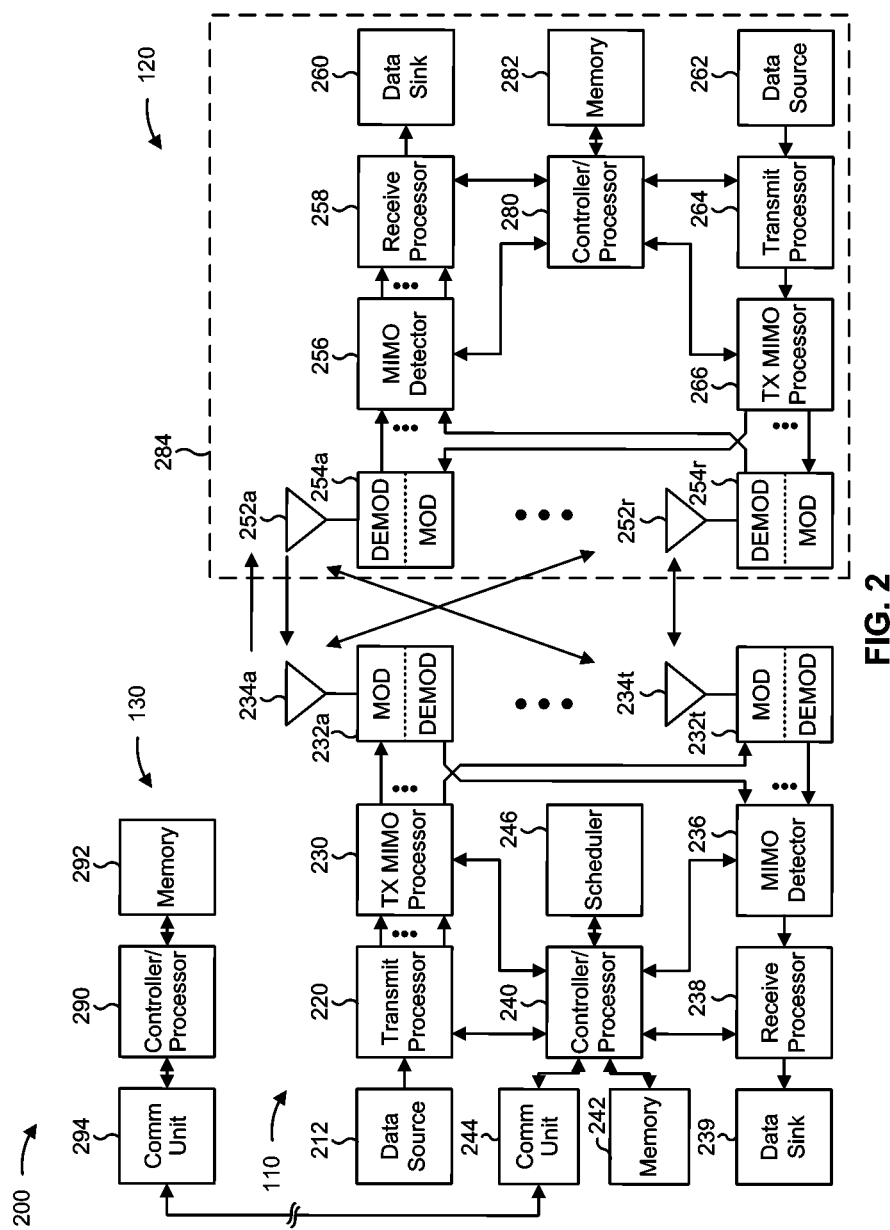
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with tone reservation based at least in part on a signal distortion, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a base station (e.g., base station 110 and/or apparatus 800 of FIG. 8) includes means for determining a signal distortion based at least in part on a number of analog-to-digital conversion (ADC) bits used for signal quantization at a UE; means for remapping a tone reservation and data based at least in part on the signal distortion; or means for transmitting, to the UE, a remapped tone reservation and remapped data. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving a sounding reference signal from the UE, means for estimating a downlink channel between the base station and the UE based at least in part on the sounding reference signal, or means for remapping the tone reservation based at least in part on the downlink channel estimated between the base station and the UE.

In some aspects, the base station includes means for receiving a sounding reference signal from the UE, or means for estimating the number of ADC bits used for signal quantization at the UE based at least in part on the sounding reference signal.

In some aspects, the base station includes means for receiving, from the UE, an indication of the number of ADC bits used for signal quantization at the UE.

In some aspects, the base station includes means for updating a default tone reservation based at least in part on the signal distortion to produce the remapped tone reservation.

In some aspects, the base station includes means for remapping the tone reservation based at least in part on one or more of: machine learning, gradient descent techniques, root-finding techniques, a least mean squares technique, a constraint-unconstraint optimization, hypothesis iteration testing, or a signal clipping in a time domain.

In some aspects, a UE (e.g., UE 120 and/or apparatus 900 of FIG. 9) includes means for receiving, from a base station, an indication of a tone reservation location, wherein the tone reservation location corresponds to a remapped tone reservation that is based at least in part on a signal distortion associated with a number of ADC bits used for signal quantization at the UE; means for receiving, from the base station, the remapped tone reservation and remapped data; or means for discarding the remapped tone reservation from the remapped data based at least in part on the indication of the tone reservation locations. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving the indication of the tone reservation location in a medium access control (MAC) control element (CE).

In some aspects, the UE includes means for receiving the indication of the tone reservation location comprises receiving the indication of the tone reservation location in a radio resource control (RRC) message.

In some aspects, the UE includes means for receiving the indication of the tone reservation location comprises receiving the indication of the tone reservation location in downlink control information.

In some aspects, the UE includes means for transmitting, to the base station, an indication of the number of ADC bits used for signal quantization at the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE ADC may convert samples of an analog signal into digital values. A resolution of the UE ADC may correspond to a number of bits used to digitize the samples. The resolution may define a smallest voltage change that can be measured by the UE ADC. A high-resolution UE ADC that corresponds to a higher number of bits may provide an increased level of measurement precision, as compared to a low-resolution UE ADC that corresponds to fewer bits. However, the low-resolution UE ADC may reduce power consumption at the UE. The reduced power consumption may occur at the low-resolution UE ADC, as well as a UE digital front end (DFE) that is communicatively coupled to the low-resolution UE ADC, as the UE DFE may process a lower bit width baseband signal due to the low-resolution UE ADC.

Power consumption reduction at the UE ADC and/or the UE DFE is a challenging aspect of 5G-NR systems, and an increased need for power consumption reduction is expected due to bandwidth growth. The bandwidth growth may be associated with an increase in "sampling frequency," which may refer to an average number of samples per time period. "Bandwidth growth" may refer to growth of certain bands, such as FR4, FR5, 6G bands, and so on. Power consumption at the UE ADC may be linear with the sampling frequency, so expected increases in the sampling frequency may result in increased power consumption at the UE ADC.

Figure 3:
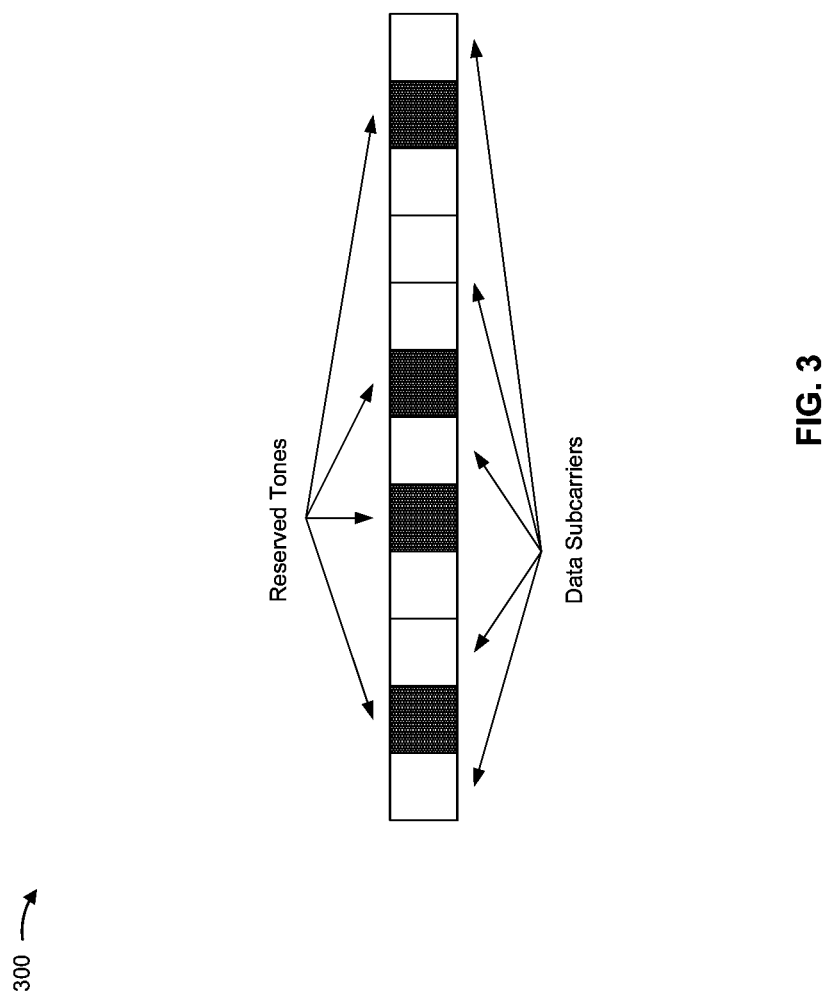
FIG. 3 is a diagram illustrating an example of tone reservations and data subcarriers, in accordance with various aspects of the present disclosure.

FIG. 3 is a diagram illustrating an example 300 of tone reservations and data subcarriers, in accordance with various aspects of the present disclosure.

As shown in FIG. 3, tone reservation is a mechanism used by a base station to reduce an amount of quantization distortion of a time domain signal. Tone reservations (or reserved tones) may be multiplexed with data subcarriers. In other words, in a plurality of subcarriers, some subcarriers in the plurality of subcarriers may be used for data and other subcarriers in the plurality of subcarriers may correspond to the tone reservations. The tone reservations and the data may be transmitted from the base station to a UE. The tone reservations may be associated with certain values, which may reduce the amount of quantization distortion of the time domain signal, as compared to a case in which subcarriers associated with the tone reservations are not used (e.g., the subcarriers are instead associated with overhead).

Traditional tone reservation mechanisms are not sensitive to which carriers are used for reducing the quantization distortion of the time domain signal. In other words, traditional tone reservation mechanisms may not select specific subcarriers to be associated with the tone reservations or to be associated with data.

As indicated above, FIG. 3 is provided as an example. Other examples may differ from what is described with regard to FIG. 3.

A tradeoff between a level of performance and an amount of power consumption may be optimized by dynamically setting an ADC resolution. However, dynamically setting the ADC resolution may result in UE ADC clipping, which is a form of signal distortion. Further, dynamically setting the ADC resolution may result in UE ADC quantization distortion. The distortion due to clipping and/or the quantization may degrade a performance of the UE ADC.

In various aspects of techniques and apparatuses described herein, a tone reservation mechanism may be employed at a base station and/or a UE to reduce UE ADC clipping and quantization distortion. The reduction in the UE ADC clipping and quantization distortion may allow a UE ADC to implement a dynamically adjustable ADC resolution, which may reduce power consumption at the UE. In other words, the tone reservation mechanism may reduce the UE ADC clipping and quantization distortion, thereby improving a UE performance.

In various aspects of techniques and apparatuses described herein, tone reservations and data may be remapped based at least in part on a channel between the base station and the UE and/or a number of UE ADC bits. Remapped tone reservations may be associated with remapped tone reservation locations, which may result in reduced UE ADC clipping and quantization distortion. In other words, the tone reservation mechanism may combine the tone reservations and the data at different locations (or subcarriers), and generate a configuration of subcarriers that corresponds to different locations, such that the UE ADC clipping and quantization distortion may be reduced.

Figure 4:
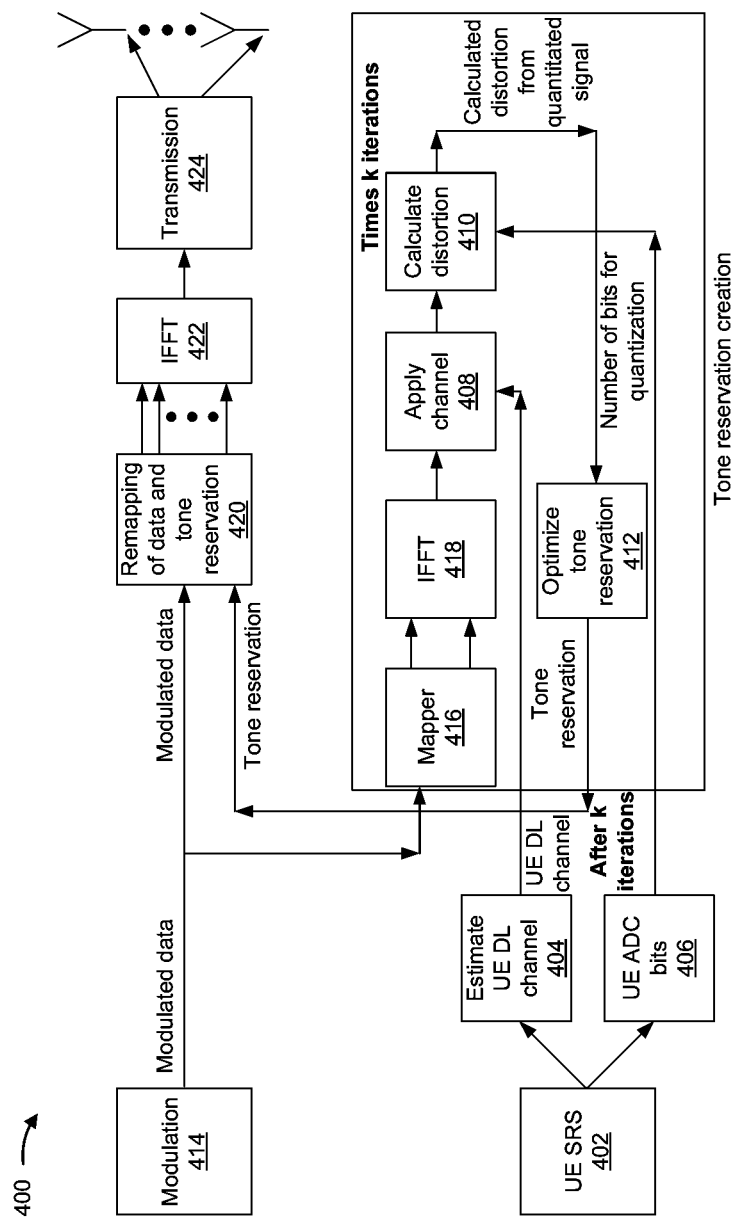
FIGS. 4-5 are diagrams illustrating examples associated with tone reservation based at least in part on a signal distortion, in accordance with various aspects of the present disclosure.

FIG. 4 is a diagram illustrating an example 400 associated with tone reservation based at least in part on a signal distortion, in accordance with various aspects of the present disclosure.

As shown by reference number 402, a base station (e.g., base station 110) may receive a sounding reference signal (SRS) from a UE (e.g., UE 120). The UE may transmit the SRS to the base station in an uplink. The SRS may be a single SRS transmission, a periodic SRS transmission, or an aperiodic SRS transmission.

As shown by reference number 404, the base station may estimate an uplink channel quality based at least in part on the SRS. The uplink channel quality may be associated with an uplink channel between the UE and the base station. In some aspects, the base station may be configured with a reciprocity channel assumption. In other words, the base station may assume that the uplink channel quality corresponds to a downlink channel quality. The base station may determine the downlink channel quality based at least in part on the uplink channel quality. Thus, the base station may use the SRS received from the UE to estimate the downlink channel quality between the base station and the UE.

As shown by reference number 406, the base station may estimate a number of UE ADC bits based at least in part on the SRS received from the UE. The base station may estimate a UE ADC resolution based at least in part on the SRS received from the UE, where the UE ADC resolution corresponds to the UE ADC bits. The SRS may indicate the uplink channel quality to the base station, and the uplink channel quality may enable the base station to estimate the number of UE ADC bits. The number of UE ADC bits may be used for signal quantization at the UE. In some aspects, the base station may use additional information, such as a signal-to-interference-plus-noise ratio (SINR) report, along with the SRS to estimate the number of UE ADC bits.

In some aspects, the base station may receive an indication from the UE that indicates the number of UE ADC bits. In other words, in this example, rather than estimating the number of UE ADC bits, the base station may receive an explicit indication from the UE that indicates the number of UE ADC bits.

As shown by reference number 408, the base station may create time domain samples of a UE physical downlink shared channel (PDSCH) and tone reservations. The time domain samples of the UE PDSCH may correspond to downlink shared channel data. The tone reservations may be default tone reservations associated with default locations and default values, where the default tone reservations may be received from a mapper of the base station. The default locations may be default resource element (RE) locations. In some aspects, the base station may apply the estimated downlink channel quality, as determined based at least in part on the SRS, to the time domain samples of the UE PDSCH and the tone reservations. In other words, the base station may associate the estimated downlink channel quality with the time domain samples of the UE PDSCH and default tone reservations.

As shown by reference number 410, the base station may calculate a signal distortion that would be created from quantizing a downlink signal associated with the time domain samples of the UE PDSCH and default tone reservations. The base station may calculate the signal distortion based at least in part on the number of UE ADC bits. The signal distortion may include a signal quantization distortion and/or a signal clipping distortion associated with the UE ADC. In other words, the signal distortion may be a UE ADC clipping and quantization distortion, which may result from quantizing the downlink signal associated with the time domain samples of the UE PDSCH and default tone reservations. The signal distortion may be based at least in part on a limited number of UE ADC bits, which may be the case with a low-resolution UE ADC which uses fewer ADC bits.

As shown by reference number 412, the base station may optimize the tone reservations based at least in part on the calculated signal distortion. In other words, the base station may update the tone reservations to reduce the signal distortion (e.g., the UE ADC clipping and quantization distortion) based at least in part on the calculated signal distortion. The base station may update the tone reservations by updating locations and/or values associated with the tone reservations. By adjusting the tone reservation locations and tone reservation values, the calculated signal distortion may be reduced.

In some aspects, the base station may generate the tone reservations to reduce the signal distortion (e.g., the UE ADC clipping and quantization distortion), which may be based at least in part on the limited number of UE ADC bits. The tone reservations may be associated with RE locations. For example, a given tone reservation may be associated with a given RE location and a symbol value, subject to certain energy constraints.

In some aspects, the base station may optimize a number of resources to use for the tone reservations. For example, the base station may calculate the number of resources to use for the tone reservations, such that the calculated signal distortion may be reduced. The base station may test one or more sets of resources to use for the tone reservations, and the base station may select a set of resources for the tone reservations that corresponds to a lowest calculated signal distortion as compared to other sets of resources. The base station may determine the resources to use based at least in part on machine learning, or similar techniques.

In some aspects, the base station may update the tone reservations based at least in part on various techniques, such as machine learning, gradient descent techniques, root-finding techniques, a least mean squares technique, a constraint-unconstraint optimization, hypothesis iteration testing, and/or a signal clipping and quantization in a time domain. In other words, the base station may use one or more techniques to adjust the tone reservation locations and/or tone reservation values accordingly, such that the calculated signal distortion may be reduced. The base station may use the one or more techniques to determine updated tone reservation locations and/or updated tone reservation values.

In some aspects, the base station may perform k iterations of determining updated tone reservation locations and/or updated tone reservation values, where k is a configurable parameter. For example, the base station may perform k iterations of estimating the downlink channel quality, applying the estimated downlink channel quality, calculating the signal distortion that would be created from quantizing the downlink signal, and optimizing the tone reservations to reduce the signal distortion. With each iteration, the base station may calculate a configuration of tone reservation locations and/or tone reservation values that produces a lower signal distortion. In other words, each iteration may further refine the tone reservation locations and/or tone reservation values to reduce the signal distortion.

As shown by reference number 414, downlink data may be modulated to produce modulated data. The downlink data may be associated with the time domain samples of the UE PDSCH.

As shown by reference number 416, when the base station performs another iteration, the base station may update the mapper with the updated tone reservation locations and/or updated tone reservation values. In addition, the mapper may receive the modulated data.

As shown by reference number 418, the modulated data and the updated tone reservation locations and/or updated tone reservation values may be provided to an inverse Fast Fourier Transform (IFFT) component of the base station, which may be used for signal conversion from a frequency domain to a time domain.

In some aspects, the base station may apply the estimated downlink channel quality, calculate the signal distortion, and further optimize the updated tone reservation locations and/or updated tone reservation values, similar to as described above.

In some aspects, after k iterations, and/or after the calculated signal distortion satisfies a threshold, the updated tone reservations may be outputted. The updated tone reservations may correspond to updated tone reservation locations and/or updated tone reservation values, which may reduce the calculated signal distortion (e.g., the UE ADC clipping and quantization distortion).

As shown by reference number 420, the base station may perform a remapping of the modulated data and the updated tone reservations. The remapping may involve adjusting a configuration of the modulated data and the updated tone reservations, based at least in part on the updated tone reservation locations and/or updated tone reservation values. The remapping of the modulated data and the updated tone reservations may produce remapped tone reservations and remapped data.

In some aspects, the remapped tone reservations may be associated with tone reservation locations and tone reservation values that reduce the signal distortion at the UE. For example, the remapped tone reservations may reduce the signal distortion at the UE caused by the number of ADC bits used for signal quantization at the UE. In some aspects, the remapped tone reservations may be based at least in part on the downlink channel estimated between the base station and the UE. In some aspects, the remapped tone reservations may be an update or optimization to the default tone reservations, where the default tone reservations may be associated with default tone reservation locations and default tone values.

As shown by reference number 422, the remapped tone reservations and the remapped data may be provided to an IFFT component of the base station, which may be used for signal conversion from a frequency domain to a time domain.

As shown by reference number 424, the remapped tone reservations and the remapped data may be transmitted to the UE. The remapped tone reservations may be associated with a reduced signal distortion at the UE (e.g., the UE ADC clipping and quantization distortion).

As indicated above, FIG. 4 is provided as an example. Other examples may differ from what is described with regard to FIG. 4.

Figure 5:
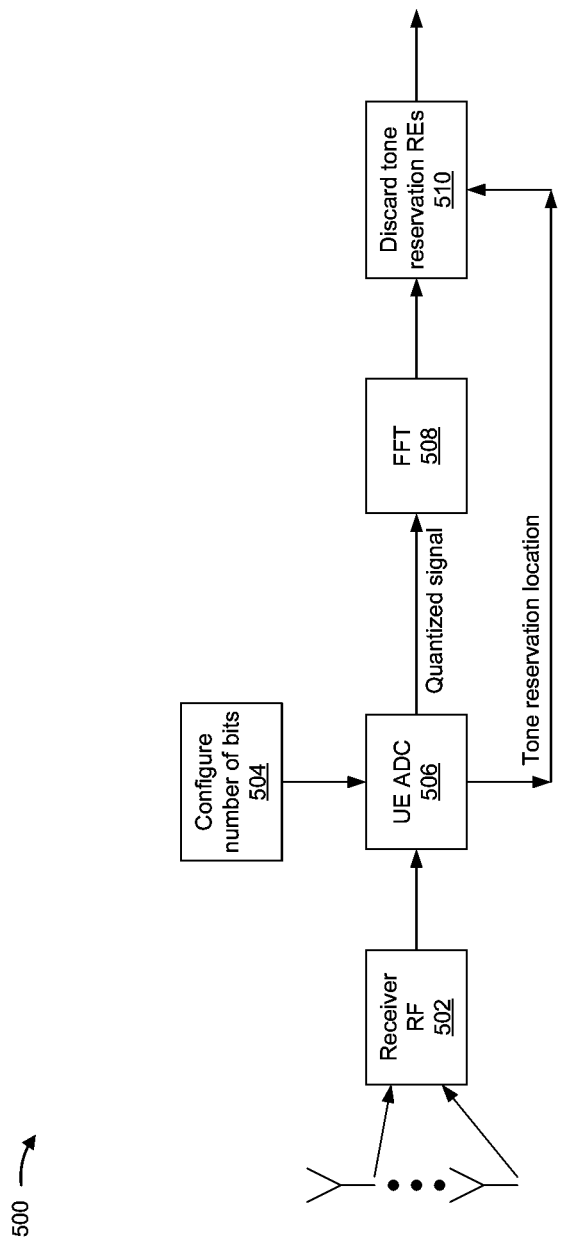

FIG. 5 is a diagram illustrating an example 500 associated with tone reservation based at least in part on a signal distortion, in accordance with various aspects of the present disclosure.

As shown by reference number 502, a UE (e.g., UE 120) may receive, from a base station (e.g., base station 110), remapped tone reservations and remapped data. Additionally, the UE may receive, from the base station, an indication of tone reservation locations. The tone reservation locations may correspond to the remapped tone reservations. The remapped tone reservations may be associated with a reduced signal distortion at the UE (e.g., UE ADC clipping and quantization distortion).

In some aspects, the UE may receive the indication of the tone reservation locations in a MAC CE. In some aspects, the UE may receive the indication of the tone reservation locations in an RRC message. The UE may receive the indication of the tone reservation locations in downlink control information (DCI).

As shown by reference number 504, a number of UE ADC bits may be configured for a UE ADC. The number of UE ADC bits may correspond to a resolution of the UE ADC. For example, a higher number of UE ADC bits may correspond to a higher resolution of the UE ADC, whereas a lower number of UE ADC bits may correspond to a lower resolution of the UE ADC.

As shown by reference number 506, the remapped tone reservations, the remapped data, and the indication of the tone reservation locations may be received at the UE ADC. The UE ADC may convert the remapped tone reservations, the remapped data, and the indication from analog signals to digital signals.

As shown by reference number 508, a quantized signal outputted from the UE ADC may be provided to a Fast Fourier Transform (FFT) component of the UE, which may be used for signal conversion from a time domain to a frequency domain.

As shown by reference number 510, the UE may discard or delete the remapped tone reservations from the remapped data based at least in part on the indication of the tone reservation locations, where the indication may be received via the MAC CE, the RRC message, or the DCI. In other words, the UE may use the received tone reservation locations to discard tone reservations from data symbols. The indication of the tone reservation locations may enable the UE to discard the tone reservations associated with the tone reservation locations. The UE may delete REs associated with subcarriers of the remapped tone reservations.

As indicated above, FIG. 5 is provided as an example. Other examples may differ from what is described with regard to FIG. 5.

Figure 6:
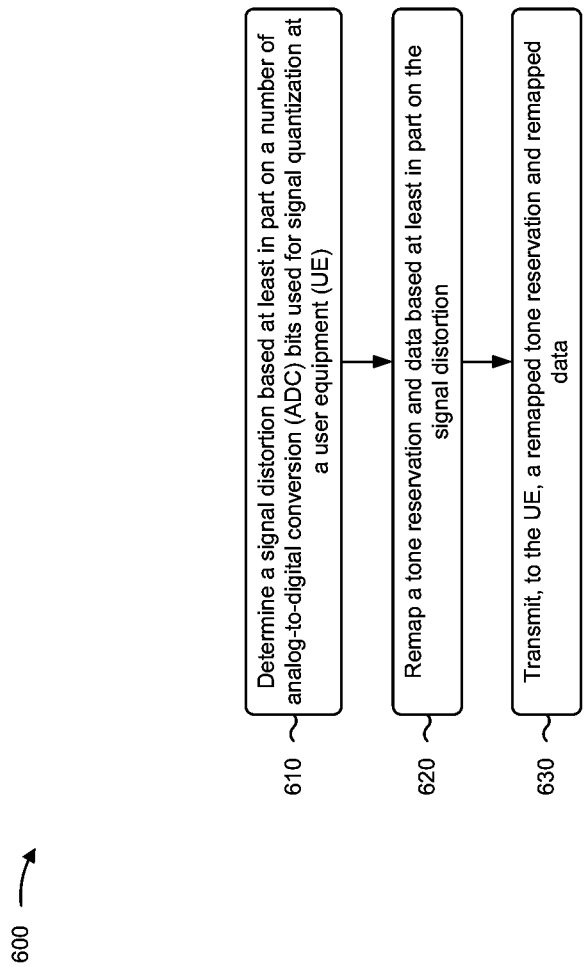
FIGS. 6-7 are diagrams illustrating example processes associated with tone reservation based at least in part on a signal distortion, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110) performs operations associated with tone reservation based at least in part on a signal distortion.

As shown in FIG. 6, in some aspects, process 600 may include determining a signal distortion based at least in part on a number of ADC bits used for signal quantization at a UE (block 610). For example, the base station (e.g., using determination component 808, depicted in FIG. 8) may determine a signal distortion based at least in part on a number of ADC bits used for signal quantization at a UE, as described above.

As further shown in FIG. 6, in some aspects, process 600 may include remapping a tone reservation and data based at least in part on the signal distortion (block 620). For example, the base station (e.g., using remapping component 810, depicted in FIG. 8) may remap a tone reservation and data based at least in part on the signal distortion, as described above.

As further shown in FIG. 6, in some aspects, process 600 may include transmitting, to the UE, a remapped tone reservation and remapped data (block 630). For example, the base station (e.g., using transmission component 804, depicted in FIG. 8) may transmit, to the UE, a remapped tone reservation and remapped data, as described above.

Process 600 may include additional aspects, such as any single aspect or any combination of aspects described below and/or in connection with one or more other processes described elsewhere herein.

In a first aspect, the remapped tone reservation is associated with a tone reservation location and a tone value, and the tone reservation location is associated with a resource element location.

In a second aspect, alone or in combination with the first aspect, the remapped tone reservation reduces the signal distortion at the UE caused by the number of ADC bits used for signal quantization at the UE, and the signal distortion is one or more of a signal quantization distortion or a signal clipping distortion.

In a third aspect, alone or in combination with one or more of the first and second aspects, process 600 includes receiving a sounding reference signal from the UE and estimating a downlink channel between the base station and the UE based at least in part on the sounding reference signal, and remapping the tone reservation based at least in part on the signal distortion comprises remapping the tone reservation based at least in part on the downlink channel estimated between the base station and the UE.

In a fourth aspect, alone or in combination with one or more of the first through third aspects, process 600 includes receiving a sounding reference signal from the UE, and estimating the number of ADC bits used for signal quantization at the UE based at least in part on the sounding reference signal.

In a fifth aspect, alone or in combination with one or more of the first through fourth aspects, process 600 includes receiving, from the UE, an indication of the number of ADC bits used for signal quantization at the UE.

In a sixth aspect, alone or in combination with one or more of the first through fifth aspects, remapping the tone reservation comprises updating a default tone reservation based at least in part on the signal distortion to produce the remapped tone reservation, wherein the default tone reservation is associated with a default tone reservation location and a default tone value.

In a seventh aspect, alone or in combination with one or more of the first through sixth aspects, remapping the tone reservation based at least in part on the signal distortion comprises remapping the tone reservation based at least in part on one or more of machine learning, gradient descent techniques, root-finding techniques, a least mean squares technique, a constraint-unconstraint optimization, hypothesis iteration testing, or a signal clipping in a time domain.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
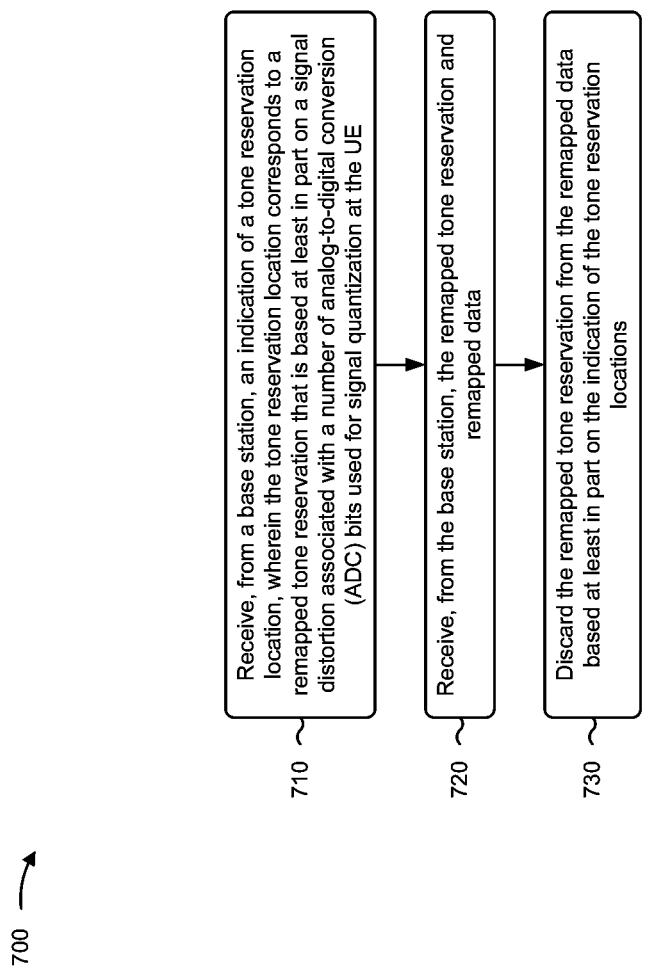

FIG. 7 is a diagram illustrating an example process 700 performed, for example, by a UE, in accordance with various aspects of the present disclosure. Example process 700 is an example where the UE (e.g., UE 120) performs operations associated with tone reservation based at least in part on a signal distortion.

As shown in FIG. 7, in some aspects, process 700 may include receiving, from a base station, an indication of a tone reservation location, wherein the tone reservation location corresponds to a remapped tone reservation that is based at least in part on a signal distortion associated with a number of ADC bits used for signal quantization at the UE (block 710). For example, the UE (e.g., using reception component 902, depicted in FIG. 9) may receive, from a base station, an indication of a tone reservation location, wherein the tone reservation location corresponds to a remapped tone reservation that is based at least in part on a signal distortion associated with a number of ADC bits used for signal quantization at the UE, as described above.

As further shown in FIG. 7, in some aspects, process 700 may include receiving, from the base station, the remapped tone reservation and remapped data (block 720). For example, the UE (e.g., using reception component 902, depicted in FIG. 9) may receive, from the base station, the remapped tone reservation and remapped data, as described above.

As further shown in FIG. 7, in some aspects, process 700 may include discarding the remapped tone reservation from the remapped data based at least in part on the indication of the tone reservation locations (block 730). For example, the UE (e.g., using discarding component 908, depicted in FIG. 9) may discard the remapped tone reservation from the remapped data based at least in part on the indication of the tone reservation locations, as described above.

Process 700 may include additional aspects, such as any single aspect or any combination of aspects described below and/or in connection with one or more other processes described elsewhere herein.

In a first aspect, the remapped tone reservation is associated with the tone reservation location and a tone value, and the tone reservation location is associated with a resource element location.

In a second aspect, alone or in combination with the first aspect, the remapped tone reservation reduces the signal distortion at the UE caused by the number of ADC bits used for signal quantization at the UE, and the signal distortion is one or more of a signal quantization distortion or a signal clipping distortion.

In a third aspect, alone or in combination with one or more of the first and second aspects, receiving the indication of the tone reservation location comprises receiving the indication of the tone reservation location in a MAC CE.

In a fourth aspect, alone or in combination with one or more of the first through third aspects, receiving the indication of the tone reservation location comprises receiving the indication of the tone reservation location in a radio resource control message.

In a fifth aspect, alone or in combination with one or more of the first through fourth aspects, receiving the indication of the tone reservation location comprises receiving the indication of the tone reservation location in downlink control information.

In a sixth aspect, alone or in combination with one or more of the first through fifth aspects, the remapped tone reservation is based at least in part on a downlink channel between the UE and the base station.

In a seventh aspect, alone or in combination with one or more of the first through sixth aspects, process 700 includes transmitting, to the base station, an indication of the number of ADC bits used for signal quantization at the UE.

In an eighth aspect, alone or in combination with one or more of the first through seventh aspects, the remapped tone reservation is based at least in part on an update to a default tone reservation, wherein the default tone reservation is associated with a default tone reservation location.

In a ninth aspect, alone or in combination with one or more of the first through eighth aspects, the update to the default tone reservation to produce the remapped tone reservation is based at least in part on one or more of machine learning, gradient descent techniques, root-finding techniques, a least mean squares technique, a constraint-unconstraint optimization, hypothesis iteration testing, or a signal clipping in a time domain.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
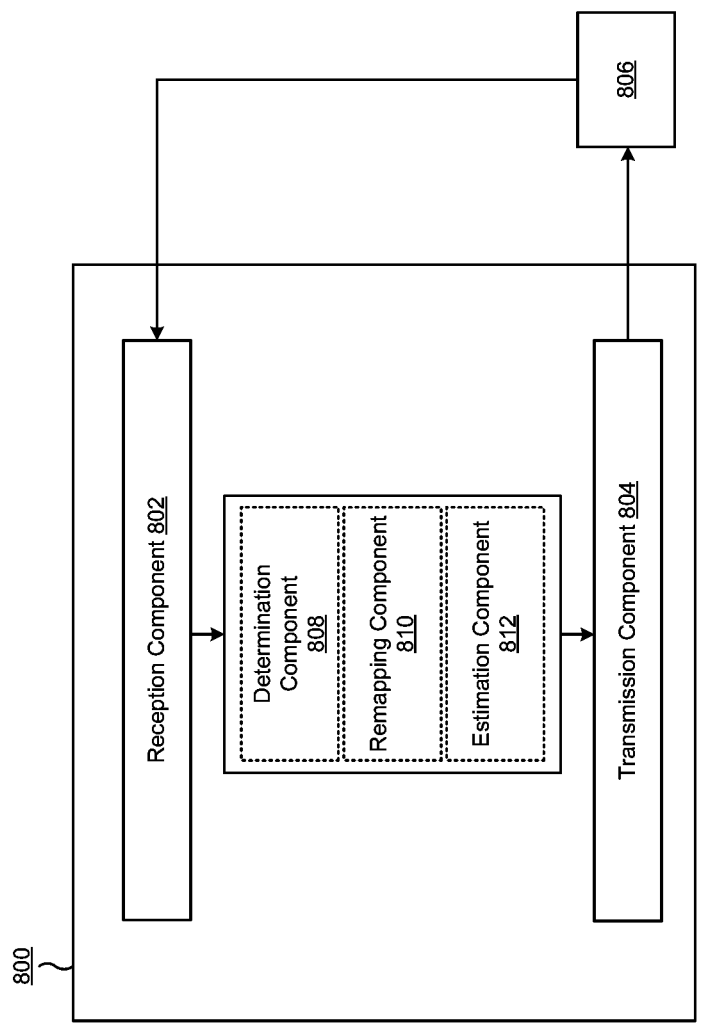
FIGS. 8-9 are block diagrams of example apparatuses for wireless communication, in accordance with various aspects of the present disclosure.

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, a remapping component 810, or an estimation component 812, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The determination component 808 may determine a signal distortion based at least in part on a number of ADC bits used for signal quantization at a UE. The remapping component 810 may remap a tone reservation and data based at least in part on the signal distortion. The transmission component 804 may transmit, to the UE, a remapped tone reservation and remapped data.

The reception component 802 may receive a sounding reference signal from the UE. The estimation component 812 may estimate a downlink channel between the base station and the UE based at least in part on the sounding reference signal. The remapping component 810 may remap the tone reservation based at least in part on the downlink channel estimated between the base station and the UE.

The reception component 802 may receive a sounding reference signal from the UE. The estimation component 812 may estimate the number of ADC bits used for signal quantization at the UE based at least in part on the sounding reference signal. The reception component 802 may receive, from the UE, an indication of the number of ADC bits used for signal quantization at the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
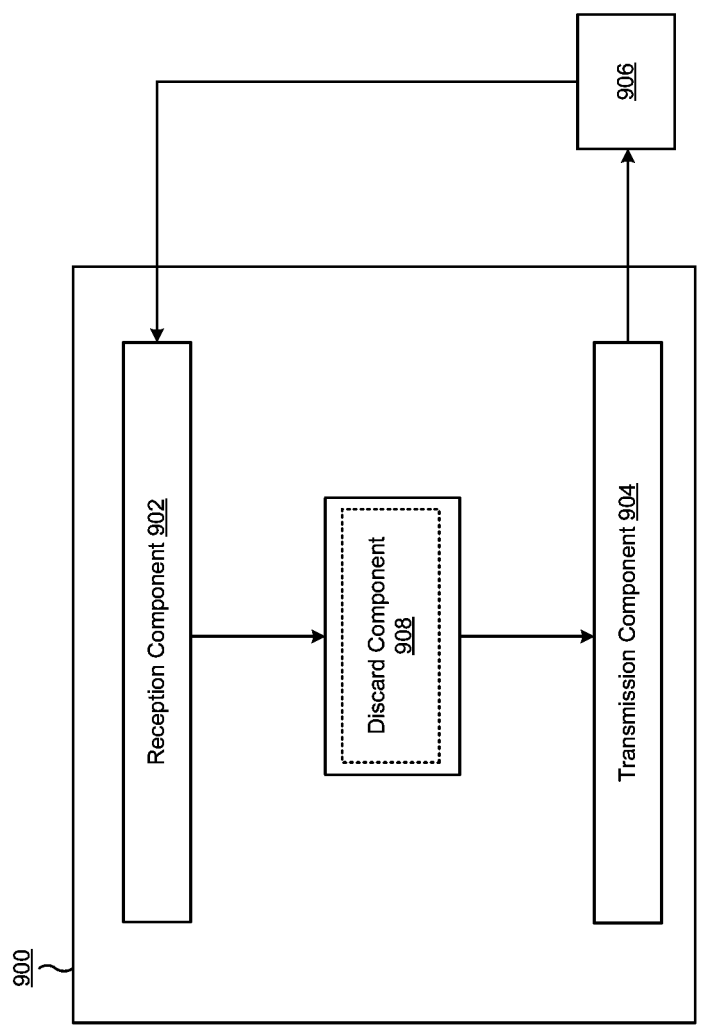

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a discard component 908, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, an indication of a tone reservation location, wherein the tone reservation location corresponds to a remapped tone reservation that is based at least in part on a signal distortion associated with a number of ADC bits used for signal quantization at the UE. The reception component 902 may receive, from the base station, the remapped tone reservation and remapped data. The discard component 908 may discard the remapped tone reservation from the remapped data based at least in part on the indication of the tone reservation locations.

The reception component 902 may receive the indication of the tone reservation location in a MAC CE. The reception component 902 may receive the indication of the tone reservation location in a radio resource control message. The reception component 902 may receive the indication of the tone reservation location comprises receiving the indication of the tone reservation location in downlink control information. The transmission component 904 may transmit, to the base station, an indication of the number of ADC bits used for signal quantization at the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station, comprising:
   determining a signal distortion based at least in part on a number of analog-to-digital conversion (ADC) bits used for signal quantization at a user equipment (UE);
   remapping a tone reservation and data based at least in part on the signal distortion; and
   transmitting, to the UE, a remapped tone reservation and remapped data.

2. The method of claim 1, wherein the remapped tone reservation is associated with a tone reservation location and a tone value, and wherein the tone reservation location is associated with a resource element location.

3. The method of claim 1, wherein the remapped tone reservation reduces the signal distortion at the UE caused by the number of ADC bits used for signal quantization at the UE, and wherein the signal distortion is one or more of a signal quantization distortion or a signal clipping distortion.

4. The method of claim 1, further comprising:
   receiving a sounding reference signal from the UE;
   estimating a downlink channel between the base station and the UE based at least in part on the sounding reference signal; and
   wherein remapping the tone reservation based at least in part on the signal distortion comprises remapping the tone reservation based at least in part on the downlink channel estimated between the base station and the UE.

5. The method of claim 1, further comprising:
   receiving a sounding reference signal from the UE; and
   estimating the number of ADC bits used for signal quantization at the UE based at least in part on the sounding reference signal.

6. The method of claim 1, further comprising:
   receiving, from the UE, an indication of the number of ADC bits used for signal quantization at the UE.

7. The method of claim 1, wherein remapping the tone reservation comprises updating a default tone reservation based at least in part on the signal distortion to produce the remapped tone reservation, wherein the default tone reservation is associated with a default tone reservation location and a default tone value.

8. The method of claim 1, wherein remapping the tone reservation based at least in part on the signal distortion comprises remapping the tone reservation based at least in part on one or more of: machine learning, gradient descent techniques, root-finding techniques, a least mean squares technique, a constraint-unconstraint optimization, hypothesis iteration testing, or a signal clipping in a time domain.

9. A method of wireless communication performed by a user equipment (UE), comprising:
   receiving, from a base station, an indication of a tone reservation location, wherein the tone reservation location corresponds to a remapped tone reservation that is based at least in part on a signal distortion associated with a number of analog-to-digital conversion (ADC) bits used for signal quantization at the UE;
   receiving, from the base station, the remapped tone reservation and remapped data; and
   discarding the remapped tone reservation from the remapped data based at least in part on the indication of the tone reservation locations.

10. The method of claim 9, wherein the remapped tone reservation is associated with the tone reservation location and a tone value, and wherein the tone reservation location is associated with a resource element location.

11. The method of claim 9, wherein the remapped tone reservation reduces the signal distortion at the UE caused by the number of ADC bits used for signal quantization at the UE, and wherein the signal distortion is one or more of a signal quantization distortion or a signal clipping distortion.

12. The method of claim 9, wherein receiving the indication of the tone reservation location comprises receiving the indication of the tone reservation location in a medium access control (MAC) control element (CE).

13. The method of claim 9, wherein receiving the indication of the tone reservation location comprises receiving the indication of the tone reservation location in a radio resource control message.

14. The method of claim 9, wherein receiving the indication of the tone reservation location comprises receiving the indication of the tone reservation location in downlink control information.

15. The method of claim 9, wherein the remapped tone reservation is based at least in part on a downlink channel between the UE and the base station.

16. The method of claim 9, further comprising:
transmitting, to the base station, an indication of the number of ADC bits used for signal quantization at the UE.

17. The method of claim 9, wherein the remapped tone reservation is based at least in part on an update to a default tone reservation, wherein the default tone reservation is associated with a default tone reservation location.

18. The method of claim 17, wherein the update to the default tone reservation to produce the remapped tone reservation is based at least in part on one or more of: machine learning, gradient descent techniques, root-finding techniques, a least mean squares technique, a constraint-unconstraint optimization, hypothesis iteration testing, or a signal clipping in a time domain.

19. A base station for wireless communication, comprising:
a memory; and
one or more processors operatively coupled to the memory, the memory and the one or more processors configured to:
determine a signal distortion based at least in part on a number of analog-to-digital (ADC) conversion bits used for signal quantization at a user equipment (UE);
remap a tone reservation and data based at least in part on the signal distortion; and
transmit, to the UE, a remapped tone reservation and remapped data.

20. The base station of claim 19, wherein the remapped tone reservation is associated with a tone reservation location and a tone value, and wherein the tone reservation location is associated with a resource element location, and wherein the remapped tone reservation reduces the signal distortion at the UE caused by the number of ADC bits used for signal quantization at the UE, and wherein the signal distortion is one or more of a signal quantization distortion or a signal clipping distortion.

21. The base station of claim 19, wherein the one or more processors are further configured to:
receive a sounding reference signal from the UE;
estimate a downlink channel between the base station and the UE based at least in part on the sounding reference signal; and
wherein the one or more processors, when remapping the tone reservation based at least in part on the signal distortion, are configured to remap the tone reservation based at least in part on the downlink channel estimated between the base station and the UE.

22. The base station of claim 19, wherein the one or more processors are further configured to:
receive a sounding reference signal from the UE; and
estimate the number of ADC bits used for signal quantization at the UE based at least in part on the sounding reference signal.

23. The base station of claim 19, wherein the one or more processors are further configured to:
receive, from the UE, an indication of the number of ADC bits used for signal quantization at the UE.

24. The base station of claim 19, wherein remapping the tone reservation comprises updating a default tone reservation based at least in part on the signal distortion to produce the remapped tone reservation, wherein the default tone reservation is associated with a default tone reservation location and a default tone value.

25. The base station of claim 19, wherein the one or more processors, when remapping the tone reservation based at least in part on the signal distortion, are configured to remap the tone reservation based at least in part on one or more of: machine learning, gradient descent techniques, root-finding techniques, a least mean squares technique, a constraint-unconstraint optimization, hypothesis iteration testing, or a signal clipping in a time domain.

26. A user equipment (UE) for wireless communication, comprising:
a memory; and
one or more processors operatively coupled to the memory, the memory and the one or more processors configured to:
receive, from a base station, an indication of a tone reservation location, wherein the tone reservation location corresponds to a remapped tone reservation that is based at least in part on a signal distortion associated with a number of analog-to-digital conversion (ADC) bits used for signal quantization at the UE;
receive, from the base station, the remapped tone reservation and remapped data; and
discard the remapped tone reservation from the remapped data based at least in part on the indication of the tone reservation locations.

27. The UE of claim 26, wherein the remapped tone reservation is associated with the tone reservation location and a tone value, and wherein the tone reservation location is associated with a resource element location, and wherein the remapped tone reservation reduces the signal distortion at the UE caused by the number of ADC bits used for signal quantization at the UE, and wherein the signal distortion is one or more of a signal quantization distortion or a signal clipping distortion.

28. The UE of claim 26, wherein the one or more processors, when receiving the indication of the tone reservation location, are configured to:
receive the indication of the tone reservation location in a medium access control (MAC) control element (CE);
receive the indication of the tone reservation location in a radio resource control message; or
receive the indication of the tone reservation location in downlink control information.

29. The UE of claim 26, wherein the one or more processors are further configured to:
transmit, to the base station, an indication of the number of ADC bits used for signal quantization at the UE.

30. The UE of claim 26, wherein the remapped tone reservation is based at least in part on an update to a default tone reservation, wherein the default tone reservation is associated with a default tone reservation location, and wherein the update to the default tone reservation to produce the remapped tone reservation is based at least in part on one or more of: machine learning, gradient descent techniques, root-finding techniques, a least mean squares technique, a constraint-unconstraint optimization, hypothesis iteration testing, or a signal clipping in a time domain.

\* \* \* \* \*